United States Patent
Alatorre et al.

(10) Patent No.: US 9,106,675 B2
(45) Date of Patent: Aug. 11, 2015

(54) INTELLIGENT NETWORK STORAGE PLANNING WITHIN A CLUSTERED COMPUTING ENVIRONMENT

(75) Inventors: Gabriel Alatorre, Long Beach, CA (US); Eric K. Butler, San Jose, CA (US); Kavita Chavda, Roswell, GA (US); Sandeep Gopisetty, Morgan Hill, CA (US); Seshashayee S. Murthy, Yorktown Heights, NY (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/817,238

(22) Filed: Jun. 17, 2010

(65) Prior Publication Data

US 2011/0314164 A1 Dec. 22, 2011

(51) Int. Cl.
*G06F 15/16* (2006.01)
*H04L 29/08* (2006.01)
*H04L 12/24* (2006.01)
*H04L 12/26* (2006.01)

(52) U.S. Cl.
CPC ........ *H04L 67/1097* (2013.01); *H04L 41/0816* (2013.01); *H04L 41/145* (2013.01); *H04L 43/0876* (2013.01)

(58) Field of Classification Search
CPC .............. H04L 29/06; H04L 29/08576; H04L 29/08072
See application file for complete search history.

(56) References Cited

U.S. PATENT DOCUMENTS

| 5,870,564 | A | 2/1999 | Jensen et al. |
| 7,275,103 | B1 | 9/2007 | Thrasher et al. |
| 7,307,948 | B2 * | 12/2007 | Infante et al. ................. 370/225 |
| 7,668,981 | B1 | 2/2010 | Nagineni et al. |
| 8,155,518 | B2 * | 4/2012 | Young ............................. 398/25 |
| 8,204,980 | B1 * | 6/2012 | Sandstrom et al. ........... 709/224 |
| 8,280,930 | B1 * | 10/2012 | Wei et al. ....................... 707/822 |
| 2002/0013832 | A1 | 1/2002 | Hubbard |
| 2004/0054866 | A1 | 3/2004 | Blumenau et al. |

(Continued)

OTHER PUBLICATIONS

Kurmas et al., "Synthesizing Representative I/O Workloads Using Iteration Distillation", Extended Verion—GIT-CERCS-03-29; Dec. 18, 2003.*

(Continued)

*Primary Examiner* — Philip Chea
*Assistant Examiner* — Van Kim T Nguyen
(74) *Attorney, Agent, or Firm* — William E. Schiesser; Keohane & D'Alessandro PLLC; Hunter E. Webb

(57) ABSTRACT

Embodiments of the present invention provide an integrated host and subsystem port selection methodology that uses performance measurements combined with information about active data paths. This technique also helps in resilient fabric planning by selecting ports from redundant fabrics. In a typical embodiment, host port to storage port pairs that create a path between a host and a storage device will be identified. From these pairs, a set of host port to storage port candidates for communicate data from the host to the storage device will be identified based on a set of resiliency constraints. Then, a specific host port to storage port pair will be selected from the set based on a lowest joint workload measurement. A path will then be created between the specific host port and storage port, and data will be communicated from the host to the storage device via the path.

4 Claims, 7 Drawing Sheets

(56) References Cited

U.S. PATENT DOCUMENTS

| | | |
|---|---|---|
| 2005/0259632 A1* | 11/2005 | Malpani et al. ............... 370/351 |
| 2007/0076630 A1* | 4/2007 | Horton et al. ................. 370/254 |
| 2008/0301332 A1 | 12/2008 | Butler et al. |
| 2008/0301333 A1 | 12/2008 | Butler et al. |
| 2009/0089462 A1* | 4/2009 | Strutt ............................ 710/16 |
| 2010/0050172 A1 | 2/2010 | Ferris |
| 2010/0332401 A1* | 12/2010 | Prahlad et al. ................. 705/80 |
| 2011/0018998 A1* | 1/2011 | Guzik ........................... 348/143 |
| 2011/0142051 A1* | 6/2011 | Bhatt et al. .................... 370/392 |
| 2011/0276975 A1* | 11/2011 | Brown et al. ................. 718/103 |

OTHER PUBLICATIONS

Mell et al., "The Nist Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages, Oct. 2009.

Maitland, J., "Keeping Control Isn't Easy", Chapter 4: Cloud-Based Infrastructure, SearchCloudComputing.com, Publication Date: Oct. 2009, 17 pages.

* cited by examiner

INTELLIGENT NETWORK STORAGE PLANNING WITHIN A CLUSTERED COMPUTING ENVIRONMENT

FIELD OF THE INVENTION

The present invention generally relates to storage planning. Specifically, the present invention relates to intelligent network storage planning within a clustered computing environment (e.g., a Cloud computing environment).

BACKGROUND

For storage Clouds, provisioning block storage (e.g., for exporting to its customers or internally as part of file based storage provisioning), it is important that the set of host ports and storage subsystem ports chosen for performing storage input/output (I/O) are not overloaded and can meet the I/O requirements of the deployed workload. Many current tools for such storage network planning use practices such as storage ports to host ports ratios, which can be inaccurate when server virtualization is used since a single host port can be conducting I/O for numerous virtual servers. Other used techniques of separately choosing host ports and storage ports are suboptimal since the choice of one can automatically force a suboptimal choice for the other.

SUMMARY

Embodiments of the present invention provide an integrated host and subsystem port selection methodology that uses performance measurements combined with information about active data paths. This technique also helps in resilient fabric planning by selecting ports from redundant fabrics. In a typical embodiment, host port to storage port pairs that create a path between a host and a storage device will be identified. From these pairs, a set of host port to storage port candidates for communicating data from the host to the storage device will be identified based on a set of resiliency constraints. Then, a specific host port to storage port pair will be selected from the set based on a lowest joint workload measurement. A path will then be created between the specific host port and storage port, and data will be communicated from the host to the storage device via the path.

A first aspect of the present invention provides a method for intelligent network storage planning within a clustered computing environment, comprising: identifying host port to storage port pairs that create a network path between a host and a storage device within the clustered computing environment; determining a set of host port candidates from the host port to storage port pairs for communicating data from the host to the storage device based on a predetermined set of resiliency constraints; selecting a specific host port to storage port based on the set of host port candidates having a lowest joint workload measure; and creating a path between the specific host port to storage port pair through which the data will be communicated.

A second aspect of the present invention provides a system for intelligent network storage planning within a clustered computing environment, comprising: a bus; a processor coupled to the bus; and a memory medium coupled to the bus, the memory medium comprising instructions to: identify host port to storage port pairs that create a network path between a host and a storage device within the clustered computing environment; determine a set of host port candidates from the host port to storage port pairs for communicating data from the host to the storage device based on a predetermined set of resiliency constraints; select a specific host port to storage port pair based on the set of host port candidates having a lowest joint workload measure; and create a path between the specific host port to storage port pair through which the data will be communicated.

A third aspect of the present invention provides a computer program product for intelligent network storage planning within a clustered computing environment, the computer program product comprising a computer readable storage media, and program instructions stored on the computer readable storage media, to: identify host port to storage port pairs that create a network path between a host and a storage device within the clustered computing environment; determine a set of host port candidates based on the set of host port candidates for communicating data from the host to the storage device based on a predetermined set of resiliency constraints; select a specific host port to storage port pair from the set of host port to storage port pairs having a lowest joint workload measure; and create a path between the specific host port to storage port pair through which the data will be communicated.

A fourth aspect of the present invention provides a method for deploying a system for intelligent network storage planning within a clustered computing environment, comprising: providing a computer infrastructure having functionality to identify host port to storage port pairs that create a network path between a host and a storage device within the clustered computing environment; determine a set of host port candidates from the host port to storage port pairs for communicating data based on the set of host port candidates based on a predetermined set of resiliency constraints; select a specific host port to storage port pair from the set of host port to storage port pairs having a lowest joint workload measure; and create a path between the specific host port to storage port pair through which the data will be communicated.

BRIEF DESCRIPTION OF THE DRAWINGS

These and other features of this invention will be more readily understood from the following detailed description of the various aspects of the invention taken in conjunction with the accompanying drawings in which.

Figure 1:
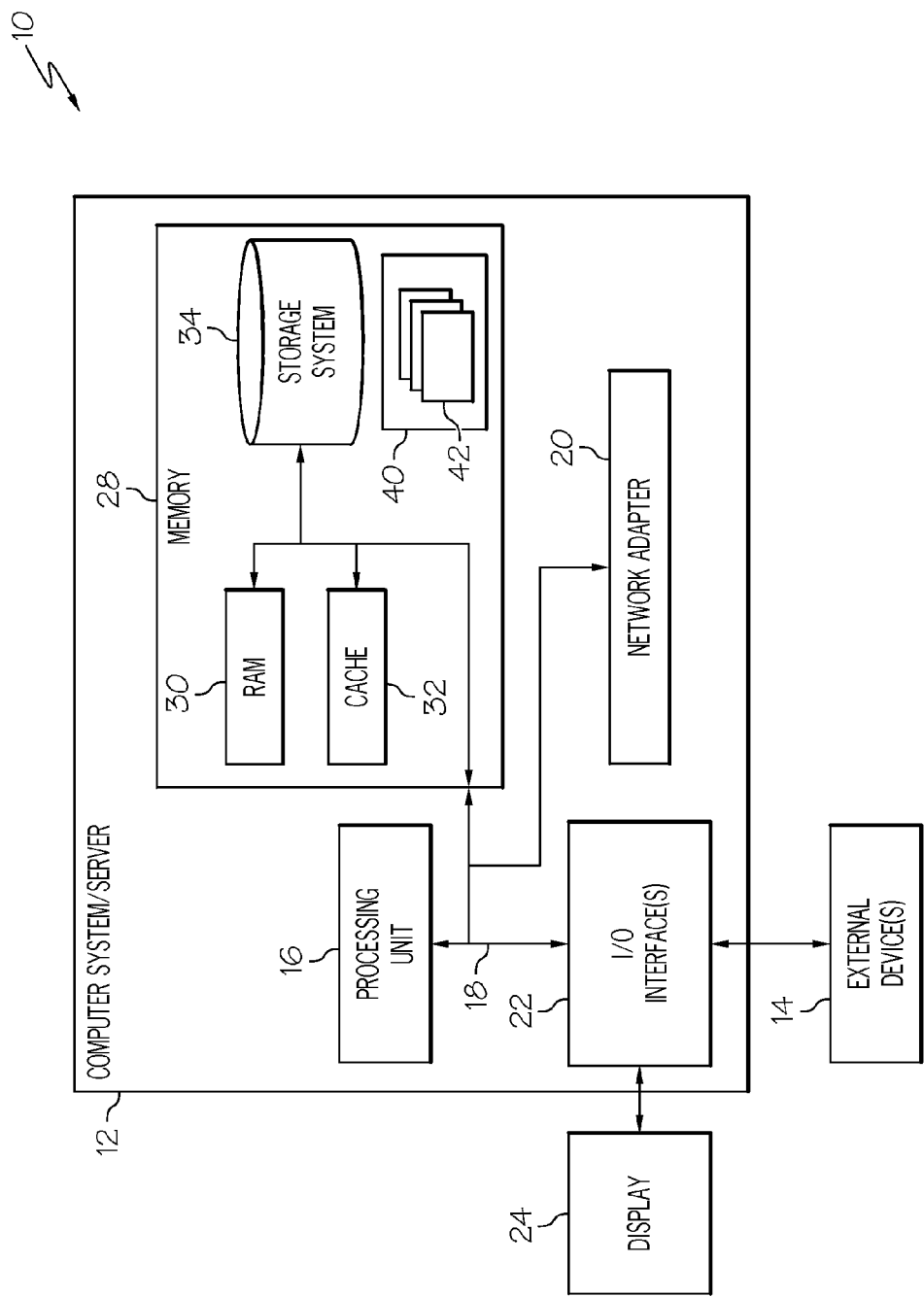
FIG. 1 depicts a Cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:
I. Cloud Computing Definitions
II. Detailed Implementation of Embodiments of the Invention I. Cloud Computing Definitions It is understood in advance that although this disclosure includes a detailed description on Cloud computing, implementation of the teachings recited herein are not limited to a Cloud computing environment. Rather, the embodiments of the present invention are capable of being implemented in conjunction with any type of clustered computing environment now known or later developed.

In any event, the following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as Follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application-hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as Follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of Embodiments of the Invention

As indicated above, embodiments of the present invention provide an integrated host and subsystem port selection methodology that uses performance measurements combined with information about active data paths. This technique also helps in resilient fabric planning by selecting ports from redundant fabrics. In a typical embodiment, host port to storage port pairs that create a path between a host and a storage device will be identified. From these pairs, a set of host port to storage port candidates for communicating data from the host to the storage device will be identified based on a set of resiliency constraints. Then, a specific host port to storage port pair will be selected from the set based on a lowest joint workload measurement. A path will then be created between the specific host port and storage port, and data will be communicated from the host to the storage device via the path.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
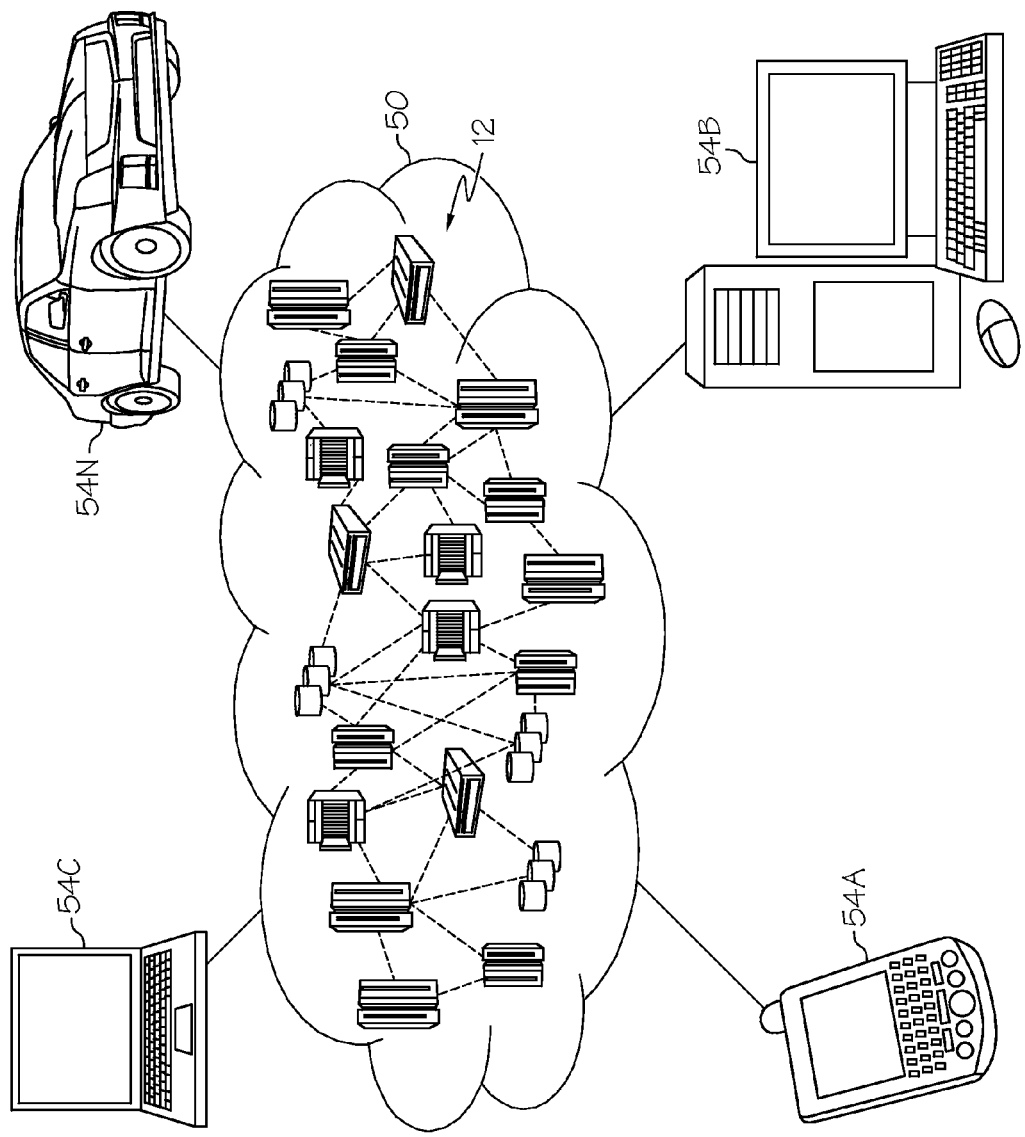
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so that each client does not have to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
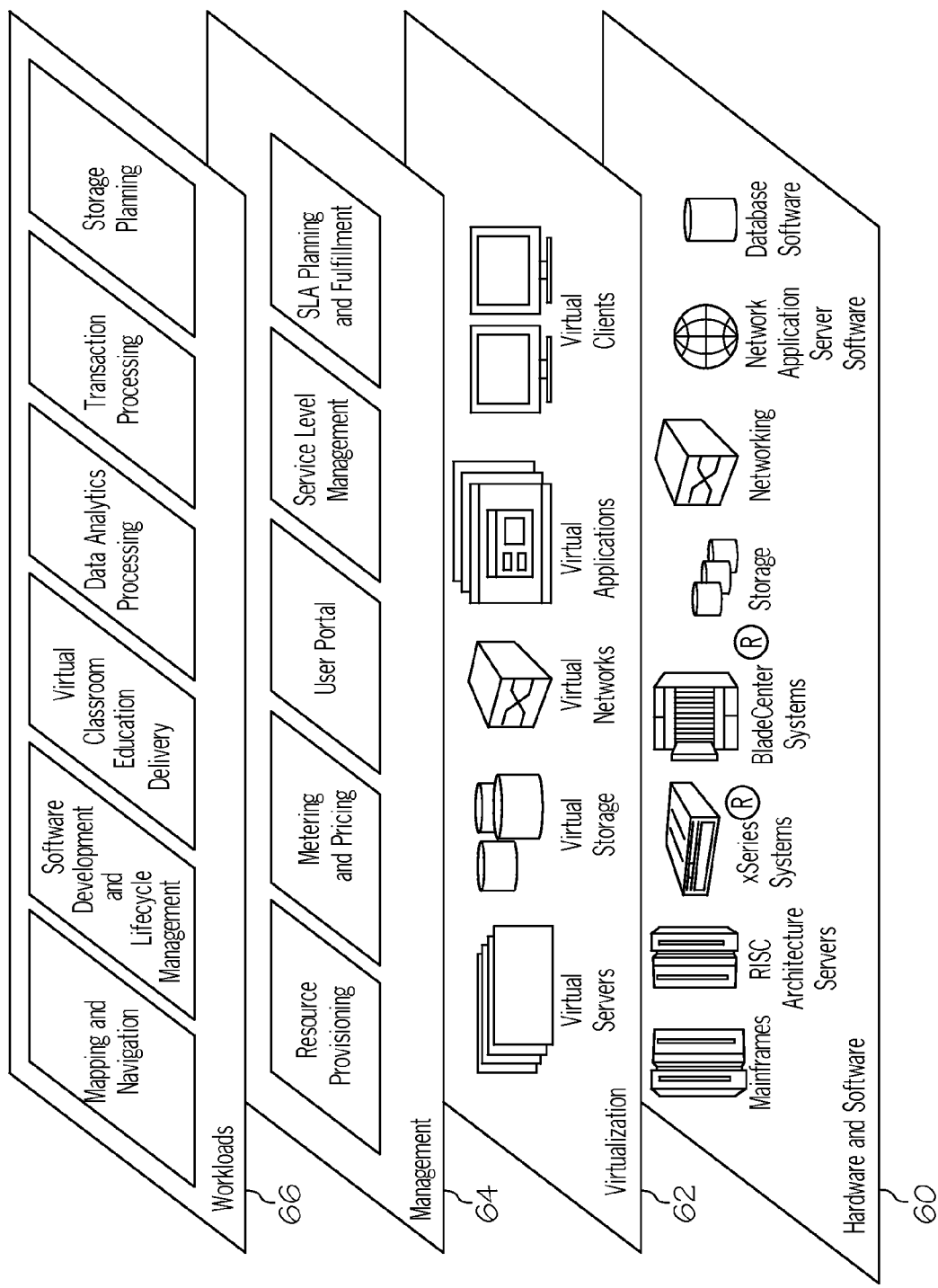
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system(s), virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for consumers/users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and storage planning. As mentioned above, all of the foregoing examples described with respect to FIG. 3 are illustrative only, and the invention is not limited to these examples.

It is understood all functions of the present invention as described herein are typically performed by the storage planning function, which can be tangibly embodied as modules of program code 42 of program/utility 40 (FIG. 1).

It is reiterated that although this disclosure includes a detailed description on Cloud computing, implementation of the teachings recited herein are not limited to a Cloud computing environment. Rather, the embodiments of the present invention are intended to be implemented with any type of clustered computing environment now known or later developed.

Figure 4:
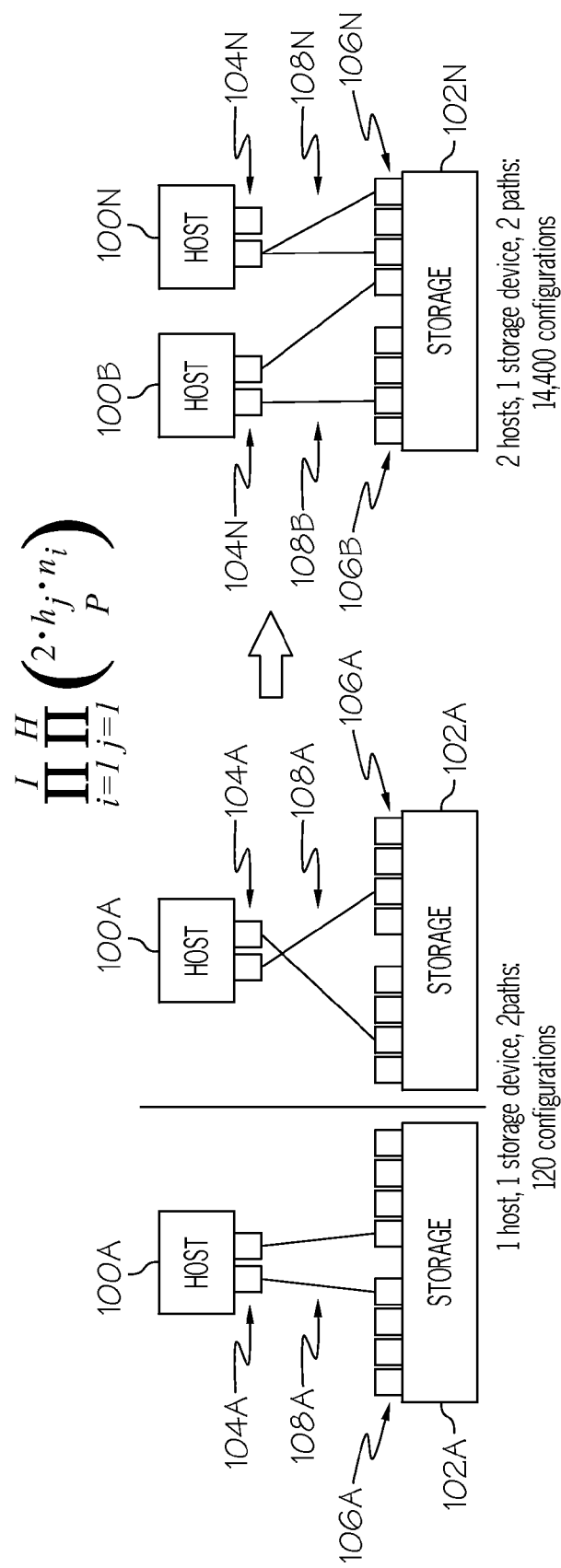
FIG. 4 depicts potential configurations between hosts and storage devices according to an embodiment of the present invention.

Referring now to FIG. 4, potential configurations between hosts 100A-N and storage devices 102A-N according to an embodiment of the present invention are shown. As shown, there can be a one-to-one relation between hosts and storage devices such as shown between host 100A and storage device 102A, or a one-to-many relationship such as between hosts 100B-N and storage device 102N. Although not shown, a single host could also interact with multiple storage devices. In any event, each host 100A-N and storage device 102A-N have a set (at least one) of ports 104A-N and 106A-N, respectively. In a typical embodiment, host ports 104A-N are paired with storage ports 106A-N so that ports 108A-N can be created therebetween. Data will be communicated via ports 108A-N from hosts 100A-N to storage devices 102A-N.

As can be seen in FIG. 4, many configurations are possible. For example, where there is one host, one storage device, and two paths, 120 configurations are possible. However, where there are two hosts, one storage device, and 2 paths for each host, 14,400 configurations are possible. These numbers grow ever greater when more paths, ports, hosts, and/or storage devices are introduced. Accordingly, manual configuration of paths is not an optimal solution.

Figure 5:
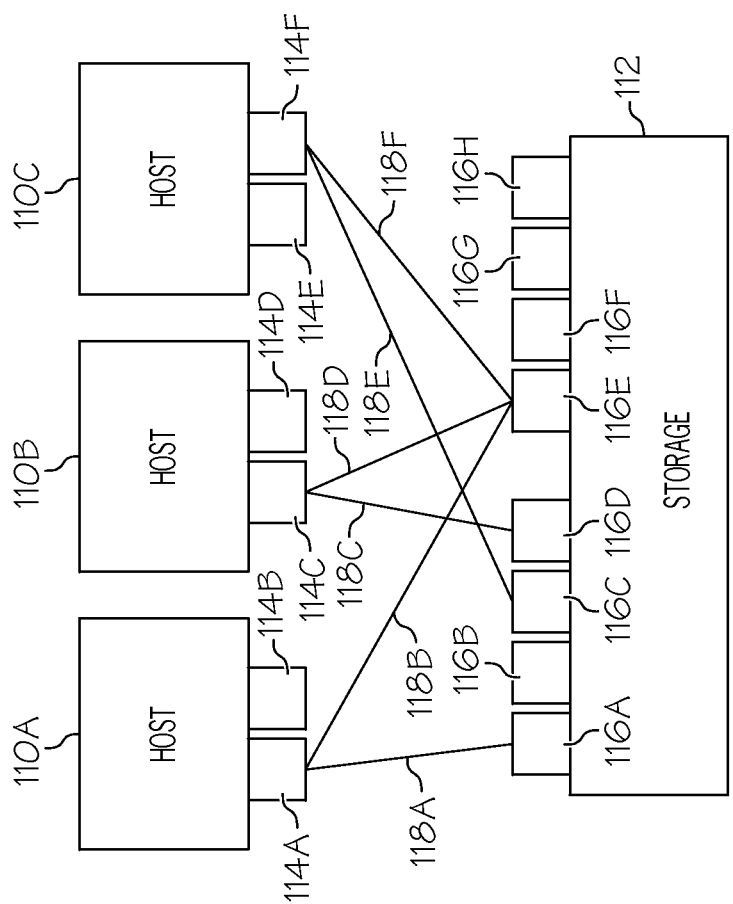
FIG. 5 depicts the creation of paths between host ports and storage ports according to an embodiment of the present invention.

Along these lines, embodiments of the present invention provide a way to intelligently and automatically configure such paths, regardless of the configuration and/or quantity of hosts, storage devices, ports, and/or, paths. FIG. 5 depicts the creation of paths 118A-F between host ports 114A-F of hosts 110A-C and storage ports 116A-F of storage device 112A according to an embodiment of the present invention. It is understood that hosts 110A-C and storage device 112 are typically implemented within a clustered computing environment such as a Cloud computing environment. For example, storage device 112 could be implemented within a storage Cloud or the like.

Regardless, in a typical embodiment, host port to storage port pairs that create a network path between host 114A-C and storage device 112 will be identified. As depicted, various pairs can be made between host ports 114A-F and storage ports 116A-H within the clustered computing environment. From the possible pairs, a set of host port candidates will be determined for communicating data from hosts 110A-C to storage device 112 based on a predetermined set of resiliency constraints. As shown in FIG. 5, illustrative candidates are host ports 114A, 114C, and 114F. Once these candidates have been determined, specific host port to storage port pairs having a lowest joint workload measure will be selected based thereon. That is, a pairing between a host port and a storage port will be made if the two ports in the pair have a lowest joint or collective workload measurement (i.e., the pairing will not result in an overload condition). In a typical embodiment, the joint workload measurement is computed by determining an estimated workload for the path between the specific host port to storage port pairs, and then summing a load balanced a load balanced score for the host and the storage device with the estimate workload.

As can be seen in FIG. 5, host port to storage port pairs include the following:

| HOST PORT | STORAGE PORT |
|-----------|--------------|
| 114A      | 116A         |
| 114A      | 116E         |
| 114C      | 116D         |
| 114C      | 116E         |
| 114F      | 116C         |
| 114F      | 116E         |

Once these pairs have been selected, paths will be created there between for data to be communicated from hosts 110A-C to storage device 112. As shown, the following illustrative host port to storage port pairs have the corresponding paths:

| PAIRS      | PATH |
|------------|------|
| 114A-116A  | 118A |
| 114A-116E  | 118B |
| 114C-116D  | 118C |
| 114C-116E  | 118D |
| 114F-116C  | 118E |
| 114F-116E  | 118F |

Figure 6:
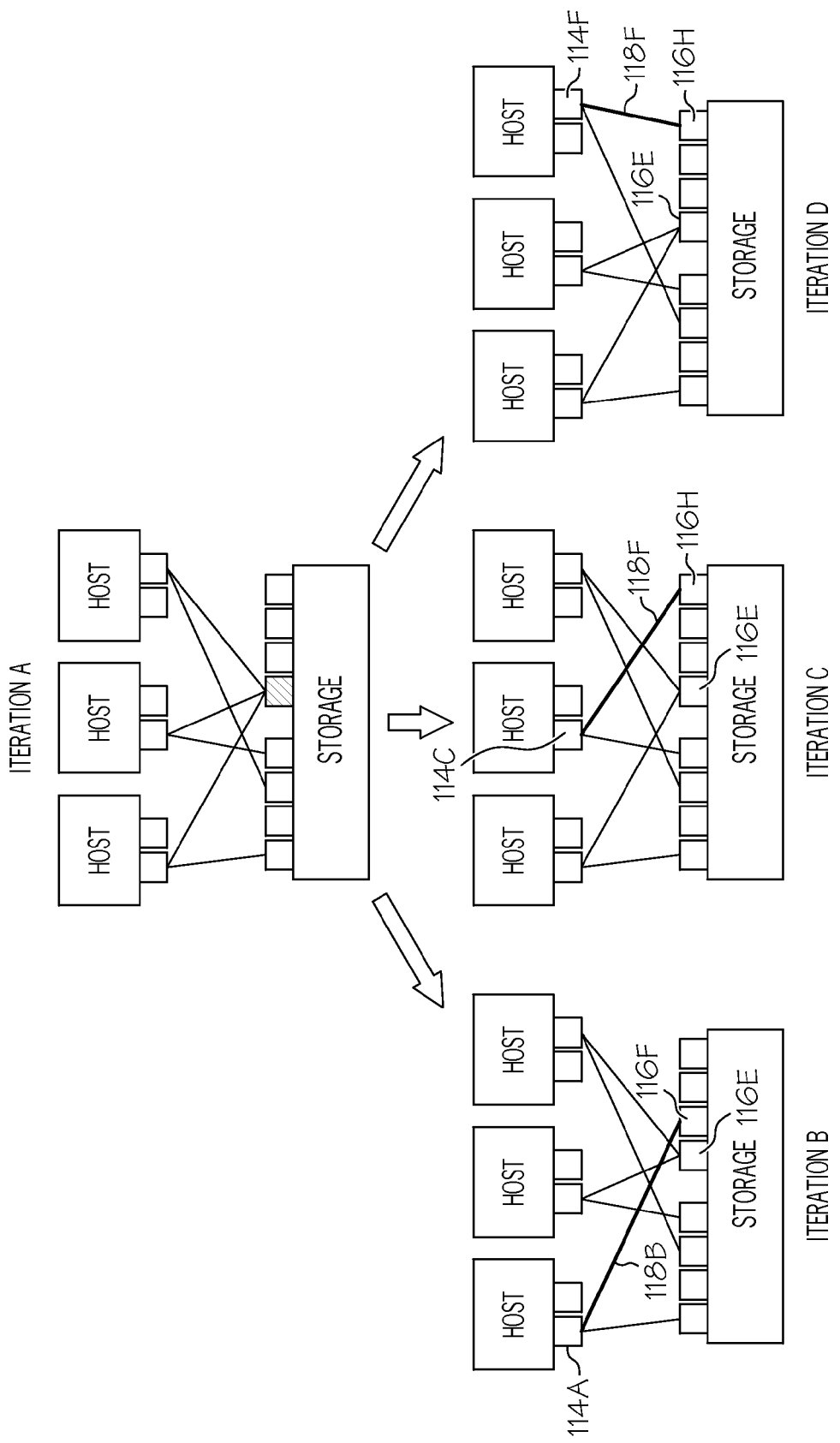
FIG. 6 depicts the iterative repetition of the process shown in FIG. 5 according to an embodiment of the present invention.

Referring now to FIG. 6, it is shown that this process is iteratively repeated with a different joint workload measure to identify alternative paths. The different workload measure is typically based on balancing a load across ports while maintaining path resiliency constraints. As shown, FIG. 5, depicts 3 different iterations: Iteration A (also referred to as the initial iteration and which was depicted in FIG. 5); iteration B; iteration C; and iteration D. As can be seen in Iteration B, path 118B no longer joins host port 114A with storage port 106E. Rather, now path 118B joins host port 104A with storage port 106F. In iteration C, path 118D no longer joins host port 114C and storage port 116E. Rather, now path 118D joins host port 114C and storage port 116H as it did in iteration A. In iteration D, path 118F no longer joins host port 114F and storage port 116E as it did in iteration A. Rather, now it joins host port 114F and storage port 116H. In general, the iterative repetition of the process stops after a predetermined period of time and/or when an alternative path cannot be identified.

Figure 7:
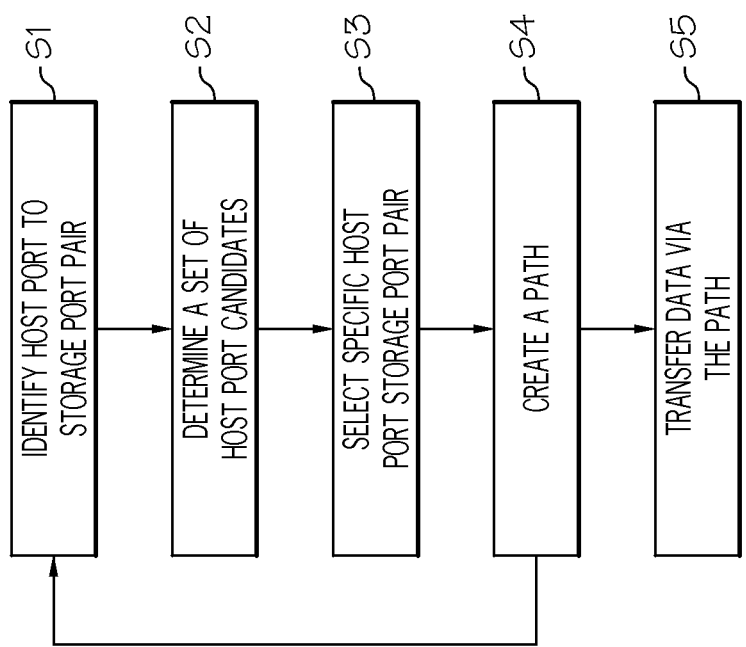
FIG. 7 depicts a method flow diagram according to an embodiment of the present invention.

This process will be summarized in conjunction with the method flow diagram of FIG. 7. In step S1, host port to storage port pairs are identified that create a network path between a host and a storage device within a clustered computing environment. In step S2, a set of host port candidates are determined from the host port to storage port pairs for communicating data from the host to the storage device based on a predetermined set of resiliency constraints. In step S3, a specific host port to storage port pair is selected based on the set of host port candidates having a lowest joint workload measure. In step S4, a path is created between the specific host port to storage port pairs through which the data will be communicated. In step S5, data is transferred via the path. As further shown, the path creation/configuration process can be iteratively repeated with a different joint workload measure to identify alternative paths. The iterative repetition is stopped after a predetermined amount of time and/or when no alternative paths can be identified.

While shown and described herein as an intelligent network storage planning solution, it is understood that the invention further provides various alternative embodiments.

For example, in one embodiment, the invention provides a computer-readable/useable medium that includes computer program code to enable a computer infrastructure to provide intelligent network storage planning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide intelligent network storage planning functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for intelligent network storage planning functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for intelligent network storage planning within a cloud computing environment, comprising:
    defining the cloud computing environment as a network of independent cloud networks;
    identifying host port to storage port pairs that create a network path between a host of one of the cloud networks and a storage device of another of the cloud networks within the cloud computing environment, each storage port in the host port to storage port pairs being used to access a single storage device;
    determining a set of host port candidates having a plurality of port candidates from the host port to storage port pairs for communicating data from the host to the storage device based on a predetermined set of resiliency constraints;
    calculating a joint workload measure for each of the set of host port candidates by determining, for every host port candidate in the set of host port candidates, an estimated workload for the network path between the specific host port to storage port pair, and summing a load balanced score for a the host and the storage device with the estimated workload;
    selecting, for every host port candidate in the set of host port candidates, a specific host port to storage port pair based on the set of host port candidates having a lowest joint workload measure;
    creating, for every host port candidate in the set of host port candidates, a path between the specific host port to storage port pair through which the data will be communicated;
    iteratively repeating the identifying, determining, calculating, and selecting based on a different workload measure, the different workload measure being based on balancing a load across ports while maintaining path resiliency constraints;
    dynamically attempting to identify at least one alternative path based on a result of the iteratively repeating;
    creating the at least one alternative path between another host port to storage port pair;
    stopping the iteratively repeating at least one of: after a predetermined period of time or in response to a failure of the attempting.

2. A system for intelligent network storage planning within a cloud computing environment, comprising:
    a bus;
    a processor coupled to the bus; and
    a memory medium coupled to the bus, the memory medium comprising instructions to: define the cloud computing environment as a network of independent cloud networks;
    identify, for a plurality of port candidates, host port to storage port pairs that create a network path between a host of one of the cloud networks and a storage device of another of the cloud networks within the cloud computing environment, each storage port in the host port to storage port pairs being used to access a single storage device;
    select, for every port candidate of the plurality of port candidates, a specific host port to storage port pair based on the set of host port candidates having a lowest joint workload measure, wherein the joint workload measure is calculated by determining an estimated workload for the network path between the specific host port to storage port pair, and summing a load balanced score for the host and the storage device with the estimated workload;
    create, for every port candidate of the plurality of port candidates, a path between the specific host port to storage port pair through which the data will be communicated;
    iteratively repeat the identifying, determining, calculating, and selecting based on a different workload measure, the different workload measure being based on balancing a load across ports while maintaining path resiliency constraints;
    dynamically attempt to identify at least one alternative path based on a result of the iterative repetition;
    create the at least one alternative path between another host port to storage port pair; and
    stop the iterative repetition at least one of: after a predetermined period of time or in response to a failure of the attempt.

3. A computer program product for intelligent network storage planning within a cloud computing environment, the computer program product comprising a non-transitory computer readable storage medium, and program instructions stored on the computer readable storage medium, to:
    define the cloud computing environment as a network of independent cloud networks;
    identify host port to storage port pairs that create a network path between a host of one of the cloud networks and a storage device of another of the cloud networks within the cloud computing environment, each storage port in the host port to storage port pairs being used to access a single storage device;
    determine a set of host port candidates having a plurality of port candidates from the host port to storage port pairs for communicating data from the host to the storage device based on a predetermined set of resiliency constraints;
    calculate, for every host port candidate in the set of host port candidates, a joint workload measure for each of the set of host port candidates by determining an estimated workload for the network path between the specific host port to storage port pair, and summing a load balanced score for the host and the storage device with the estimated workload;
    select, for every host port candidate in the set of host port candidates, a specific host port to storage port pair based on the set of host port candidates having a lowest joint workload measure;
    create, for every host port candidate in the set of host port candidates, a path between the specific host port to storage port pair through which the data will be communicated;
    iteratively repeat the identifying, determining, calculating, and selecting based on a different workload measure, the different workload measure being based on balancing a load across ports while maintaining path resiliency constraints;

dynamically attempt to identify at least one alternative path based on a result of the iterative repetition;

create the at least one alternative path between another host port to storage port pair; and stop the iterative repetition at least one of: after a predetermined period of time or in response to a failure of the attempt.

4. A method for deploying a system for intelligent network storage planning within a cloud computing environment, comprising:

providing a computer infrastructure having functionality to define the cloud computing environment as a network of independent cloud networks;

identify host port to storage port pairs that create a network path between a host of one of the cloud networks and a storage device of another of the cloud networks within the cloud computing environment, each storage port in the host port to storage port pairs being used to access a single storage device;

determine a set of host port candidates having a plurality of port candidates from the host port to storage port pairs for communicating data from the host to the storage device based on a predetermined set of resiliency constraints;

select, for every host port candidate in the set of host port candidates, a specific host port to storage port pair based on the set of host port candidates having a lowest joint workload measure, wherein the joint workload measure is calculated by determining an estimated workload for the network path between the specific host port to storage port pair, and summing a load balanced score for the host and the storage device with the estimate workload;

create, for every host port candidate in the set of host port candidates, a path between the specific host port to storage port pair through which the data will be communicated;

iteratively repeat the identifying, determining, calculating, and selecting based on a different workload measure, the different workload measure being based on balancing a load across ports while maintaining path resiliency constraints;

dynamically attempt to identify at least one alternative path based on a result of the iterative repetition;

create the at least one alternative path between another host port to storage port pair; and stop the iterative repetition at least one of: after a predetermined period of time or in response to a failure of the attempt.

\* \* \* \* \*